A. R. MILLER.
Carriage-Spring.
No. 2,785, 33,789.
Patented Nov. 26, 1861.
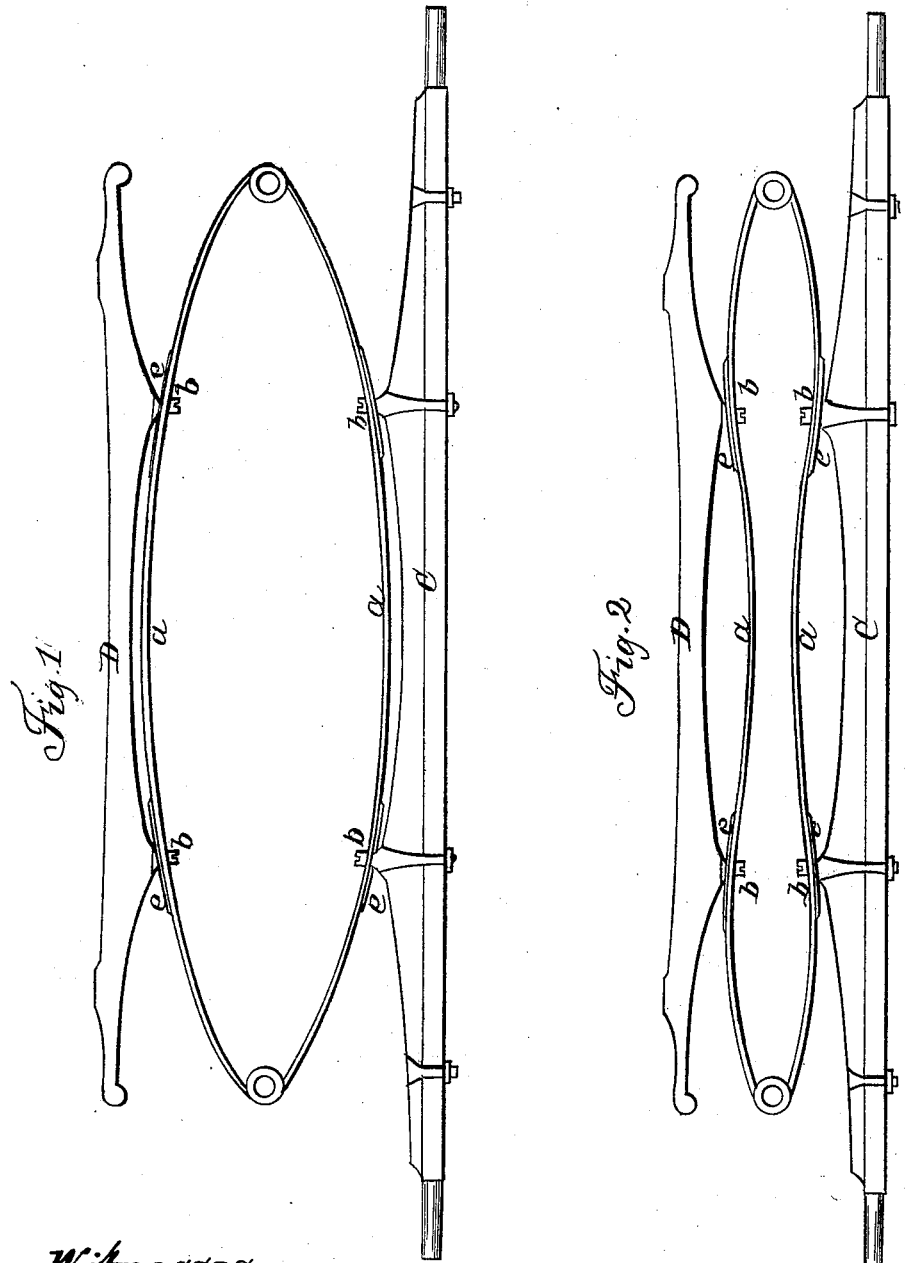

UNITED STATES PATENT OFFICE.

A. R. MILLER, OF ATTICA, NEW YORK.

IMPROVEMENT IN CARRIAGE-SPRINGS.

Specification forming part of Letters Patent No. 33,789, dated November 26, 1861.

*To all whom it may concern:*

Be it known that I, A. R. MILLER, of Attica, in the county of Wyoming and State of New York, have invented a new and useful Improvement in Elliptic Springs for Carriages; and I do hereby declare that the following is a full and exact description thereof, reference being had to the accompanying drawings, making part of this specification, in which—

Figure 1 is an elevation of my improved spring, showing also the axle and spring-bar of the carriage. Fig. 2 is a like elevation of the spring when compressed.

Similar letters designate corresponding parts in both of the figures.

It is the object of my invention to produce a spring designed more particularly for light carriages, which shall possess greater flexibility, a more gentle and easy vibration, with greater strength and less weight of metal than elliptic springs of ordinary form.

I make a spring of the usual elliptic form of a single leaf $a$ $a$ or more, the upper and lower sections being joined at their ends in the usual manner. Instead of a single central bearing, I employ two bearings, both on the upper and lower side of the springs, placing them a distance from either end of about one-fourth the length of the whole spring. The bearings are indicated by the bolts $b$ $b$, which hold the spring to the axle-tree C and spring-bar D. The prime leaf $a$ $a$ may be strengthened by adding one or more short leaves $e$ $e$ on the outer side at the bearings; but these are not intended to connect between the bearings.

As this spring possesses a greater extent of flexion than belongs to other springs of its size, provision must be made at its bearings for this action. This may be done, as represented in the drawings, by making the bearing-surface of the axle C and bar D slope off rapidly from the point of connection or by means of a clip that passes over the spring and holds it down upon a narrow edge for a bearing-surface, which it would be preferable to have made of metal; or by having a jointed clip, one part attached to the axle and the other to the spring, the pivot of the joint being the center of motion and admitting of the utmost freedom of action. Various modes of attachment, which any experienced mechanic will readily supply, will accomplish the purpose.

It will be observed that one-half of the length of the spring, being the central part comprised between the bearings $b$ $b$, is free to move, and the curve or arch being greatest at the ends or outside of these bearings, the result is that the bending of the spring causes the greatest flexion to occur in the central portion, as seen in Fig. 2; and in this respect a greatly superior action is obtained over the common elliptic spring, in which the central part, being rigidly attached to the axle, admits of scarcely any motion, and consequently the flexibility is chiefly obtained from the ends. This causes the plates to break frequently when the weight is thrown suddenly on them, and occasions an abrupt and jerking motion, which is unpleasant.

By my arrangement the motion, being transmitted through the whole extent of the spring, cannot be abrupt, and therefore obviates the greatest danger of breaking, while the motion imparted to the carriage becomes extremely gentle and easy, and the flexion has greater extent, giving the effect of a very long spring in one of only ordinary and appropriate dimensions. It also tends to keep the body of the carriage from tipping when the weight is chiefly thrown on one side, as the deflection of one end of the spring, acting as it does to depress the middle, must necessarily deflect the opposite end to a considerable extent, thus causing the carriage to ride more equally. While securing these important advantages, the spring costs less from the lesser amount of metal required, and its application to the carriage is attended with no additional expense.

What I claim as my invention, and desire to secure by Letters Patent, is—

Constructing elliptic springs with double bearings $b$ $b$, and leaving the center thereof detached from the axle and spring-bar, substantially in the manner and for the purposes shown and described.

In witness whereof I have hereunto signed my name in the presence of two subscribing witnesses.

A. R. MILLER.

Witnesses:
 J. FRASER,
 SIDNEY GEO. GWYNNE.